US009236906B2

(12) United States Patent
Gunasekara et al.

(10) Patent No.: US 9,236,906 B2
(45) Date of Patent: Jan. 12, 2016

(54) WIRELESS SIGNAL INTERFERENCE MITIGATION IN A NETWORK

(71) Applicant: Time Warner Cable Enterprises LLC, New York, NY (US)

(72) Inventors: Don Gunasekara, Reston, VA (US); Harriet DuBois, Herndon, VA (US); Kevin Caldwell, Vienna, VA (US)

(73) Assignee: Time Warner Cable Enterprises LLC, New York, NY (US)

( * ) Notice: Subject to any disclaimer, the term of this patent is extended or adjusted under 35 U.S.C. 154(b) by 192 days.

(21) Appl. No.: 13/803,432

(22) Filed: Mar. 14, 2013

(65) Prior Publication Data

US 2014/0269341 A1    Sep. 18, 2014

(51) Int. Cl.
 *H04J 3/14*    (2006.01)
 *H04B 3/32*    (2006.01)
(52) U.S. Cl.
 CPC ........................................ *H04B 3/32* (2013.01)
(58) Field of Classification Search
 USPC ................................. 370/310–327, 389–433
 See application file for complete search history.

(56) References Cited

U.S. PATENT DOCUMENTS

| | | | | |
|---|---|---|---|---|
| 6,304,594 | B1 * | 10/2001 | Salinger | 375/222 |
| 2003/0022645 | A1 * | 1/2003 | Runzo | 455/226.2 |
| 2003/0143955 | A1 * | 7/2003 | Van Winkle | 455/67.1 |
| 2006/0248565 | A1 * | 11/2006 | Shimp et al. | 725/123 |
| 2013/0322326 | A1 * | 12/2013 | Medina et al. | 370/317 |

FOREIGN PATENT DOCUMENTS

EP         1942682 A2 *  7/2008

OTHER PUBLICATIONS

"M-CMTS Operations Support System Interface Specification", Data-Over-Cable Service Interface Specifications Modular Headend Architecture, 2005-2008 Cable Television Laboratories, INC, pp. 47.
"EQAM Architectural Overview Technical Report", Data-Over-Cable Service Interface Specifications Modular Headend Architecture, 2008 Cable Television Laboratories, INC, pp. 39.

* cited by examiner

*Primary Examiner* — Kwang B Yao
*Assistant Examiner* — Juvena Loo
(74) *Attorney, Agent, or Firm* — Chapin IP Law, LLC

(57) ABSTRACT

A transmitter device transmits data over a physical communication link to at least one destination. A monitor resource monitors a frequency band of signals on the physical communication link. At least a portion of the monitored frequency band in the physical communication link used to transmit the data is also allocated for transmissions of wireless communications in a vicinity of the physical communication link. The physical communication link may be damaged for any number of reasons such as a loose connector, rodent chewing on the physical communication link, etc. The damaged locations of the physical communication link are places where the wireless communications are more likely to couple onto the physical communication link and cause interference. In response to detecting presence of an interference signal in the monitored frequency band of the physical communication link, the monitor resource transmits one or more notifications.

31 Claims, 9 Drawing Sheets

WIRELESS SIGNAL INTERFERENCE MITIGATION IN A NETWORK

BACKGROUND

Conventional cable networks have long been used to distribute content over physical communication media such as coaxial cables, fiber optic links, etc., to multiple subscribers. Typical distribution of content includes modulating a signal in accordance with QAM (Quadrature Amplitude Modulation) encoding and then transmitting the modulated QAM signal to multiple subscribers over the physical communication medium. Typically, the signals transmitted over the physical communication media are encoded at RF (Radio Frequency) oscillation rates.

There is currently is no interference mitigation technique built into cable network plants to compensate for interference caused by wireless network signals such as those associated with LTE (Long Terminate Evolution) networks. In general, LTE is a wireless network that operates in the same frequency bands as many cable operators. For example, the majority of LTE deployments in the United States are currently taking place in two Frequency bands such as band 13 (DL 746-756 MHz, UL 777-787 MHz) for Verizon™ and Band 17 (DL 734-746 MHz, UL 704-716 MHz) for AT&T™, both of which are within operating frequencies used by the cable operators.

Propagation and attenuation characteristics of wireless 700 MHz signals are very different from wireless signals at higher frequencies. For example, these relatively lower frequency signals travel further and are less attenuated by structures, etc., than higher frequency wireless signals. Thus, presence of such signals in an environment can have a greater interference impact to other devices.

Additionally, wireless base stations such as so-called pico-cells that transmit around this frequency range (e.g., 700-800 MHz) may be deployed in close proximity to a respective cable network plant, increasing a likelihood of possible interference with signals transmitted in a coaxial cable.

It is further noted that LTE technology uses so-called Orthogonal Frequency-Division Multiplexing (OFDM) in a respective downlink. This means LTE signals also have a higher peak-to-average radio (crest factor) than other cellular technologies. Generally speaking, a signal with a higher crest factor will lead to more ingress interference as the signal energy is concentrated in a smaller portion of the allocated bandwidth. Especially in the case of an LTE uplink, it is highly unlikely that all resource blocks will be allocated at the same time.

BRIEF DESCRIPTION OF EMBODIMENTS

Conventional networks suffer from deficiencies. For example, cable networks are prone to reliability issues such as insufficient shielding of core signal carrying conductors, shielding failures, loose connectors, damaged cables, etc. Any of these system imperfections can enable wireless signals transmitted over the air to couple onto a respective physical medium and interfere with a respective legitimate data signal being transmitted on the physical medium.

For example, as mentioned, wireless signals may be transmitted at a same or similar RF frequency band as an RF frequency used to transmit data over a physical communication link in a cable network environment. If the coupling of the wireless transmitted signal onto the physical medium is strong enough, a subscriber will not be able to decode the legitimate cable network data. In other words, the integrity of the original data signal transmitted in a physical communication link may be compromised in the event that the wireless signal coupled onto the physical communication link is strong enough.

Certain embodiments herein are directed to reducing an affect of wireless interference on signals present in one or more physical communication medium used to convey data to one or more downstream devices. For example, one embodiment herein includes controlling or operating a transmitter device to transmit data over a physical communication link to one or more destinations in a network environment. A monitor resource such as a receiver monitors a selected frequency band over which the transmitter device transmits data over the physical communication link. In one example embodiment, at least a portion of the frequency band monitored by the monitor resource is also allocated for transmissions of wireless communications (i.e., communications transmitted over the air) in a vicinity of the physical communication link.

As previously discussed, the physical communication link may be damaged for any number of reasons such as a loose connector, rodent chewing on the physical communication link, etc. The damaged locations of the physical communication link are places where the wireless communications are more likely to couple onto the physical communication link and cause interference to signals in the cable. In one embodiment, in response to detecting or sensing presence of an interference signal in the monitored frequency band on the physical communication link, the monitor resource transmits one or more notification to mitigate affects of the interference caused by the wireless communications coupling onto the physical communication link.

In general, any suitable frequency band of the physical communication link can be monitored for presence of wireless interference. By way of a non-limiting example, the monitored frequency band can include at least a portion of data transmitted on carrier radio frequencies between 700 and 800 MHz. At least a portion of this band is allocated to support wireless communications such as LTE communications in the network environment.

The transmitter device can be a QAM transmitter device configured to transmit data in one or more channels in the monitored frequency band. As mentioned, coupling of the wireless communications interferes with a quality of the channels of data transmitted to one or more downstream subscribers that decode the respective channel of data to play back corresponding content. In one embodiment, it is desirable to detect and correct any physical link failures.

In accordance with further embodiments, the monitor resource is configured to detect or sense presence of the interference signal (as caused by coupling of wireless signals onto the in the physical communication link) in any number ways. For example, in one embodiment, the monitor resource can be configured to detect or measure a power level of the signal transmitted over the physical communication link by the transmitter device. One example way of detecting or sensing the presence of interference is to measure attributes/parameters of signals present in the physical communication link within the monitored frequency band.

For example, the monitor resource can be configured to measure a parameter such as a magnitude of a power level of transmitting the original data signal over the physical communication link. The power level of the signal can be measured in a same frequency band at which wireless communications are also transmitted external to the physical communication link such as in a vicinity of the physical communication link. If the monitor resource detects or measures that the transmitter device transmits the original data signal above a threshold value in the monitored frequency band, the monitor resource generates one or more notifications.

The characteristics such as power level of the one or more signals present (e.g., original data signal, noise, and/or interference signal) on the physical communication link can be determined by producing an RSSI (Received Signal Strength Indicator) value for one or more signals in the monitored frequency band of interest. RSSI is a measure of RF power present in the signal present in the monitored frequency band.

Further embodiments herein can include producing a Signal-to-Noise Ratio (SNR) measurement for one or more signals in the monitored frequency band of interest. As its name suggests, the SNR measurement is a measure of a level of the original desired signal with respect to a level of background noise and interference.

Yet further embodiments herein can include producing a Voltage Standing Wave Ratio (VSWR) measurement for one or more signals in the monitored frequency band of interest. VSWR is a ratio of the amplitude of a partial standing wave at an antinode (maximum) to the amplitude at an adjacent node (minimum), in an electrical transmission line.

Note that in one embodiment, the transmitter device can be configured to automatically adjust a gain to overcome the presence of any interference or noise on the physical communication link. Some amount of interference may be acceptable and expected in a properly functioning physical communication link. However, interference above a threshold value may render the physical communication link unfit for transmitting data to one or more downstream destinations because the gain of the amplifier cannot be adjusted to a high enough level to overcome the interference.

In one embodiment, instead of measuring, the monitor resource can receive power and/or gain information (e.g., power setting information and/or power measurement information) from the transmitter device. The power information received from the transmitter device can indicate that the transmitter device attempts to transmit the original data signal above the power threshold value. As mentioned, the monitor resource generates the notification of wireless interference in response to detecting or sensing that the transmitter device at least attempts to transmit the data in the particular frequency band over the physical communication link above a power threshold value.

One notification generated by the monitor resource can be a message transmitted over a network to a maintenance resource or cable network management resource to provide notification of a respective type of detected or sensed failure at the transmitter device and/or physical communication link. The notification can include geographical information indicating a location of transmitter device and/or physical communication link where the failure is detected.

The failure notification may include any suitable information. For example, the failure notification can include a unique identifier value assigned to the transmitter device, physical communication link, etc., enabling maintenance personnel to map the unique identifier value to a corresponding physical location where the affected equipment resides in a network.

In one embodiment, the monitor resource retrieves location information specifying a location of the transmitter device and/or physical communication link in a cable network environment. The monitor resource generates the notification to indicate the location of the transmitter device and/or physical communication link. Accordingly, after detection or sensing of a failure condition such as that wireless communications have coupled onto the physical communication link above a power threshold value, maintenance personnel can be dispatched to the appropriate location where the failure was detected to fix the failure (e.g., a broken or damaged physical communication link, insufficient shielding of core signal carrying conductors, shielding failures, loose connectors, exposed signal-carrying conductors, etc.).

In accordance with further embodiments, the monitor resource also can be configured to generate control messages. For example, the monitor resource can be configured to generate a control notification in response to detecting or sensing presence of an unacceptable level of interference on the physical communication link. The monitor resource can be configured to transmit the control message to the transmitter device to control the transmitter device. For example, in one embodiment, the monitor resource can be configured to transmit a message to the transmitter device to terminate transmission of one or more channels of data in the monitored frequency band (or whole range such as 50 MHz to 1100 MHz if desired) in response to a trigger event such as detecting or sensing the coupling of the wireless communications onto the physical communication link above a threshold value.

In one embodiment, the monitor resource generates the control message to shut down one or more amplifiers generating the original data signal over the physical communication link to prevent respective amplifiers in the transmitter device from saturating and possibly being damaged. Thus, a monitor resource can be configured to generate the notification to terminate transmission of data over the physical communication link for at least a portion of the particular frequency band in which the interference is suspected. As mentioned, the notification can be a control command directed to the transmitter device. The transmitter device receives the control message and adjusts it transmission settings accordingly.

By further way of a non-limiting example, the notification produced by the monitor resource can specify one or more channels of data in the monitored frequency band that are most affected by the interference signal and that should no longer be transmitted by the transmitter device.

In yet further embodiments, the monitor resource can be configured to generate the notification of failure to include specific details about the failure. For example, a notification can further include useful troubleshooting information such as power information associated with driving the physical communication link. The power information can include information such as: settings or status information received from the transmitter device, a measured level of power on the physical communication link, a range of frequencies in which the failure occurs, the monitored frequency band in which the failure occurred due to coupling of unwanted wireless communications onto the physical communication link, presence of an interference signal on the physical communication link, one or more channels of data that are affected by the interference signal, etc. A technician receiving any or all of this additional information may be better equipped to troubleshoot and correct the system failure.

Additional techniques can be used to detect or sense presence of the interference signal in the physical communication link. For example, embodiments herein can include comparing the signal (original signal+noise+interference) in the physical communication link to a reference signal such as the original data signal. The comparator can be a difference function that that effectively removes the original signal from the signal present on the physical communication link. If the interference signal (or combination of the leftover interference signal+the noise signal) in the monitored frequency band is detected as being above a power threshold value, the monitor resource generates and transmits any of the notifications as discussed herein. Accordingly, embodiments herein can include monitoring strength such as the power level of the interference signal (which is present due to coupling of wireless communications onto the physical communication link) onto in the monitored frequency band and generating appropriate notification if the interference is above an unacceptable level.

Note that the noise on the physical communication link may be a different band than the monitored band. For example, the monitored band may be between 700 and 800 MHz. The noise on the physical communication link may be outside this range such as well below 700 MHz.

As mentioned, by way of a non-limiting example, the transmitter device can be configured to transmit an original data signal as a QAM signal over the physical communication link (e.g., any physical communication medium in a Hybrid Fiber Coaxial cable network). In such an instance, the transmitter device produces the QAM (Quadrature Amplitude Modulation) signal to include at least a first signal component and a second signal component. A combination of the first signal component and the second signal component make up the QAM transmitted signal. The QAM transmitter device can be configured to monitor either or both of the first signal component and the second signal component and automatically adjust a gain of producing the first signal component and a gain of the second signal component to overcome the interference signal present on the physical communication link as a result of the interfering wireless communication signal. As mentioned, if the QAM transmitter device attempts to adjust or succeeds at adjusting the power or gain above a threshold value, the monitor resource generates one or more notifications.

Further embodiments herein can include transmitting a notification of a detected or sensed condition such as presence of the interference signal, shutting down of the transmitter device, etc., to a remote resource manager or one or more upstream or downstream devices in the cable network environment. The remote resource manager receiving the notification can be configured to notify the relevant components (e.g., upstream and/or downstream network elements) regarding the failure. In such an instance, to reduce an amount of disruption of service, the notified network components in the upstream or downstream direction can be proactive about automatically establishing an alternative path or way in which to transmit all or a portion of the original data signal to one or more downstream subscribers.

Thus, embodiments herein include a monitor resource such as a radio receiver and associated method to detect and take necessary actions to mitigate interference caused by LTE/or other interfering wireless signals present in a cable network environment. In one embodiment, as discussed above, a monitor resource and related circuits can be configured to perform any of one or more actions in response to detecting or sensing occurrence of interference caused by coupling of one or more wireless signals onto a legitimate signal (e.g., an original data signal) transmitted over the physical communication media.

Note that any of the resources as discussed herein can include one or more computerized devices, servers, base stations, wireless communication equipment, communication management systems, workstations, handheld or laptop computers, or the like to carry out and/or support any or all of the method operations disclosed herein. In other words, one or more computerized devices or processors can be programmed and/or configured to operate as explained herein to carry out different embodiments of the invention.

Yet other embodiments herein include software programs to perform the steps and operations summarized above and disclosed in detail below. One such embodiment comprises a computer program product including a non-transitory computer-readable storage medium (i.e., any physical computer readable hardware storage medium) on which software instructions are encoded for subsequent execution. The instructions, when executed in a computerized device having a processor, program and/or cause the processor to perform the operations disclosed herein. Such arrangements are typically provided as software, code, instructions, and/or other data (e.g., data structures) arranged or encoded on a non-transitory computer readable storage medium such as an optical medium (e.g., CD-ROM), floppy disk, hard disk, memory stick, etc., or other a medium such as firmware or shortcode in one or more ROM, RAM, PROM, etc., or as an Application Specific Integrated Circuit (ASIC), etc. The software or firmware or other such configurations can be installed onto a computerized device to cause the computerized device to perform the techniques explained herein.

Accordingly, embodiments herein are directed to a method, system, computer program product, etc., that supports operations as discussed herein.

One embodiment includes a computer readable storage medium and/or system having instructions stored thereon. The instructions, when executed by a processor of a respective computer device, cause the processor or multiple processors of the system to: control or operate a transmitter device to transmit data over a physical communication link to at least one destination; monitor a frequency band of the physical communication link, at least a portion of the monitored frequency band in the physical communication link also allocated for transmissions of wireless communications in a vicinity of the physical communication link; and in response to detecting or sensing presence of an interference signal in the monitored frequency band, transmitting at least one notification.

Yet another embodiments herein includes a method and computer readable storage medium and/or system having instructions stored thereon. The instructions, when executed by a processor of a respective computer device, cause the processor or multiple processors of the system to: monitor a physical communication link over which a transmitter device transmits an original data signal to at least one downstream destination; detect or sense a condition in which the transmitter device increases a power of transmitting the original data signal above a power threshold value to overcome presence of an interference signal on the physical communication link; and in response to detecting or sensing the condition, generating at least one notification.

Yet another embodiments herein includes a method and computer readable storage medium and/or system having instructions stored thereon. The instructions, when executed by a processor of a respective computer device, cause the processor or multiple processors of the system to: initiate transmission of an original data signal from a transmitter device over a physical communication link, the original data signal transmitted downstream in a particular frequency band of the physical communication link; monitor the particular frequency band of the physical communication link; and in response to detecting or sensing presence of a wireless transmitted signal coupling onto the physical communication link in the particular band, produce a notification indicating a location of the physical communication link a network environment.

The ordering of the operations in each of the above example has been presented for clarity sake. Note that any of the processing steps as discussed herein can be performed in any suitable order.

Other embodiments of the present disclosure include software programs and/or respective hardware to perform any of the method embodiment steps and operations summarized above and disclosed in detail below.

It is to be understood that the system, method, apparatus, instructions on computer readable storage media, etc., as discussed herein also can be embodied strictly as a software program, firmware, as a hybrid of software, hardware and/or firmware, or as hardware alone such as within a processor, or within an operating system or a within a software application.

As discussed herein, techniques herein are well suited for mitigating affects caused by a interference in a physical communication link. However, it should be noted that embodiments herein are not limited to use in such applications and that the techniques discussed herein are well suited for other applications as well.

Additionally, note that although each of the different features, techniques, configurations, etc., herein may be discussed in different places of this disclosure, it is intended, where suitable, that each of the concepts can optionally be executed independently of each other or in combination with each other. Accordingly, the one or more present inventions as described herein can be embodied and viewed in many different ways.

Also, note that this preliminary discussion of embodiments herein purposefully does not specify every embodiment and/or incrementally novel aspect of the present disclosure or claimed invention(s). Instead, this brief description only presents general embodiments and corresponding points of novelty over conventional techniques. For additional details and/or possible perspectives (permutations) of the invention(s), the reader is directed to the Detailed Description section and corresponding figures of the present disclosure as further discussed below.

BRIEF DESCRIPTION OF THE DRAWINGS

The foregoing and other objects, features, and advantages of the invention will be apparent from the following more particular description of preferred embodiments herein, as illustrated in the accompanying drawings in which like reference characters refer to the same parts throughout the different views. The drawings are not necessarily to scale, with emphasis instead being placed upon illustrating the embodiments, principles, concepts, etc.

DETAILED DESCRIPTION AND FURTHER SUMMARY OF EMBODIMENTS

In accordance with general embodiments as discussed herein, a transmitter device transmits data over a physical communication link to at least one destination. A monitor resource monitors a frequency band of signals on the physical communication link. At least a portion of the monitored frequency band in the physical communication link used to transmit the data is also allocated for transmissions of wireless communications in a vicinity of the physical communication link.

The physical communication link may be damaged for any number of reasons such as a loose connector, rodent chewing on the physical communication link, etc. The damaged locations of the physical communication link are places where the wireless communications at the same transmission frequency are more likely to couple onto the physical communication link and cause interference. In response to detecting presence of an interference signal in the monitored frequency band of the physical communication link, the monitor resource transmits one or more notifications to mitigate the failure condition.

Figure 1:
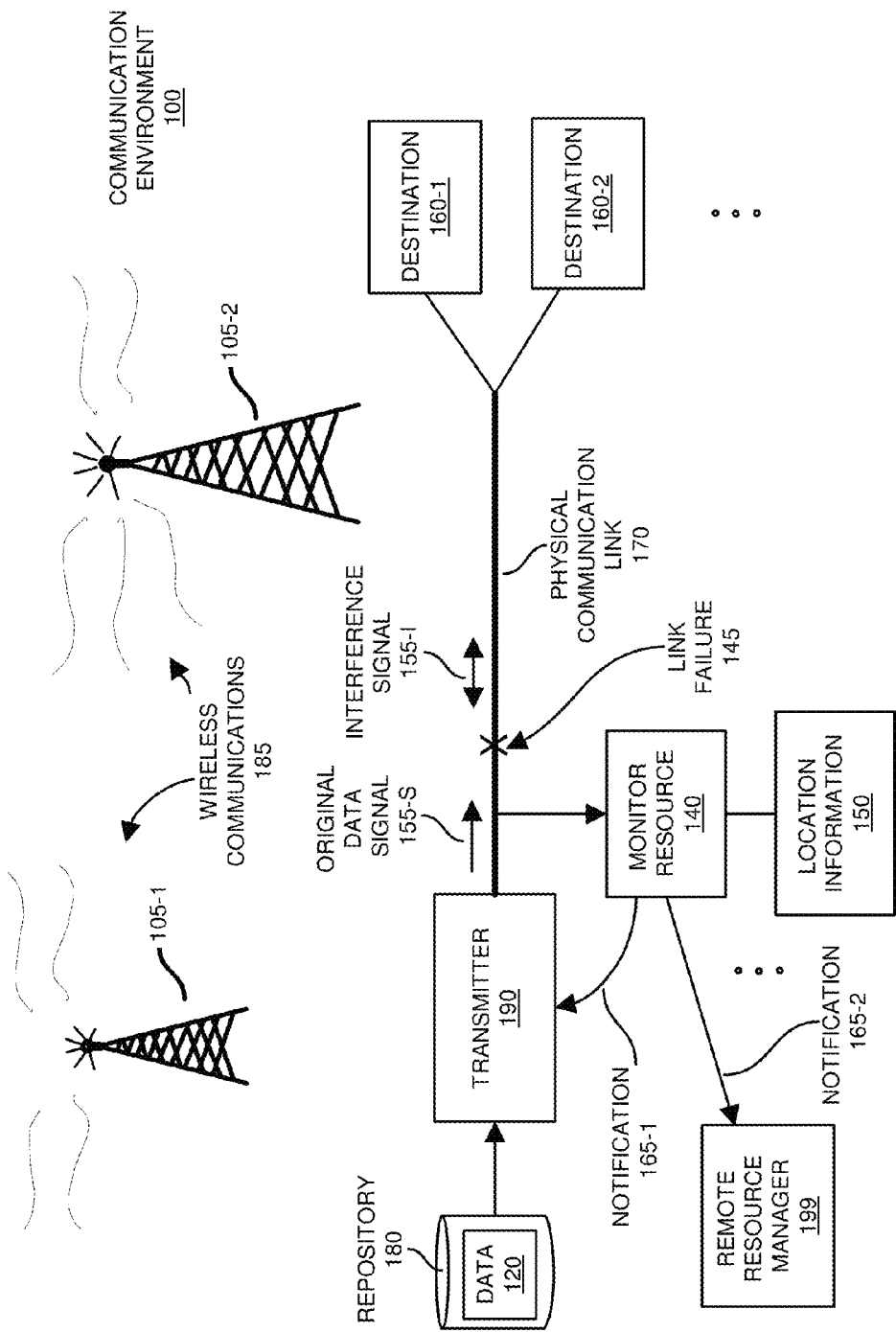
FIG. 1 is an example diagram illustrating a monitor resource configured to detect occurrence of interference coupled onto a physical communication link as caused by transmission of wireless communication signals according to embodiments herein.

Now, more specifically, FIG. 1 is an example diagram illustrating a communication environment 100 according to embodiments herein.

As shown, communication environment 100 includes transmitter 190 and physical communication link 170. In general, transmitter 190 generates and transmits original data signal 155-S over physical communication link 170 to one or more destinations 160-1, 160-2, etc.

Destinations can represent subscriber domains that retrieve and playback transmitted data, repeater devices that re-transmit the received signal, etc. As in any system, there may be a certain amount of noise present on the physical communication link 170.

During operation, the transmitter 190 receives data 120 stored in repository 180 from any suitable resource. In one non-limiting example embodiment, the transmitter 190 receives the data 120 as a stream of data in a suitable encoding format.

Transmitter 190 can be configured to modulate received data 120 in accordance with any modulation technique for transmission over physical communication link 170. In one non-limiting example embodiment, the transmitter modulates and transmits the received data 120 in accordance with QAM (Quadrature Amplitude Modulation).

Physical communication link 170 can be any suitable type of physical medium over which data 120 (which is encoded as original data signal 155-S) can be transmitted to downstream entities such as destinations 160. By further way of a non-limiting example, the physical communication link 170 can be a coaxial cable, fiber optic link, twisted pair of wires, shield conductors, etc. Physical communication link 170 may be present in a HFC (Hybrid Fiber Coaxial) cable network.

The destinations 160-1, 160-2, etc., can be any suitable entity such as subscribers and/or equipment in a cable network environment. For example, the destinations 160 can be set-top boxes, cable modems, downstream devices such as repeaters that further transmit a received signal downstream, etc. Each repeater can include a respective monitor resource 140 to monitor for the presence of interference above a threshold value.

As further shown, communication environment 100 can include one or more wireless signal generators 105 (e.g., wireless signal generator 105-1, wireless signal generator 105-2, etc.).

Each of the wireless signal generators 105 can transmit respective wireless communications (i.e., signals) at one or more different radio frequencies through the air to each other or target devices present in the communication environment 100. Generally, wireless signal generators 105 operate independently of transmitter 190.

Assume in this example that the physical communication link 170 experiences a link failure 145. As mentioned, the link failure 145 can be a broken or damaged physical communication link 170, insufficient shielding of one or more core signal-carrying conductors in physical communication link 170, a loose connectors in physical communication link 170, exposed signal-carrying conductors, etc.

The occurrence of the link failure 145 on physical communication link 170 enables coupling of wireless communications 185 as interference signal 155-I onto the physical communication link 170. Presence of the interference signal 155-I is an undesirable condition as presence of the interference signal 155-I on physical communication link 170 may make it difficult or impossible for a respective destination 160 to decode the original data signal 155-S.

Certain embodiments herein are directed to reducing an affect of wireless interference (e.g., interference signal 155-I) on signals such as original data signal 155-S present in physical communication link 170 used to convey data to one or more downstream devices (e.g., cable modems, repeaters, etc.). For example, as mentioned, one embodiment herein includes controlling or operating a transmitter 190 (e.g., a transmitter device) to transmit data 120 over a physical communication link 170 to at least one destination 160. Communication environment 100 can include monitor resource 140 disposed at any suitable location. By way of a non-limiting example, the monitor resource can be co-located in the transmitter 190. The monitor resource 140 also can be disposed at any suitable location of the physical communication link 170.

In a further one non-limiting example embodiment, using one or more respective bandpass filters, monitor resource 140 monitors a selected frequency band over which the transmitter 190 device transmits data 120 over the physical communication link 170. As mentioned, at least a portion of the frequency band monitored by the monitor resource 140 is allocated for transmissions of wireless communications 185 in a vicinity of the physical communication link 170 and/or transmitter 190.

Figure 2:
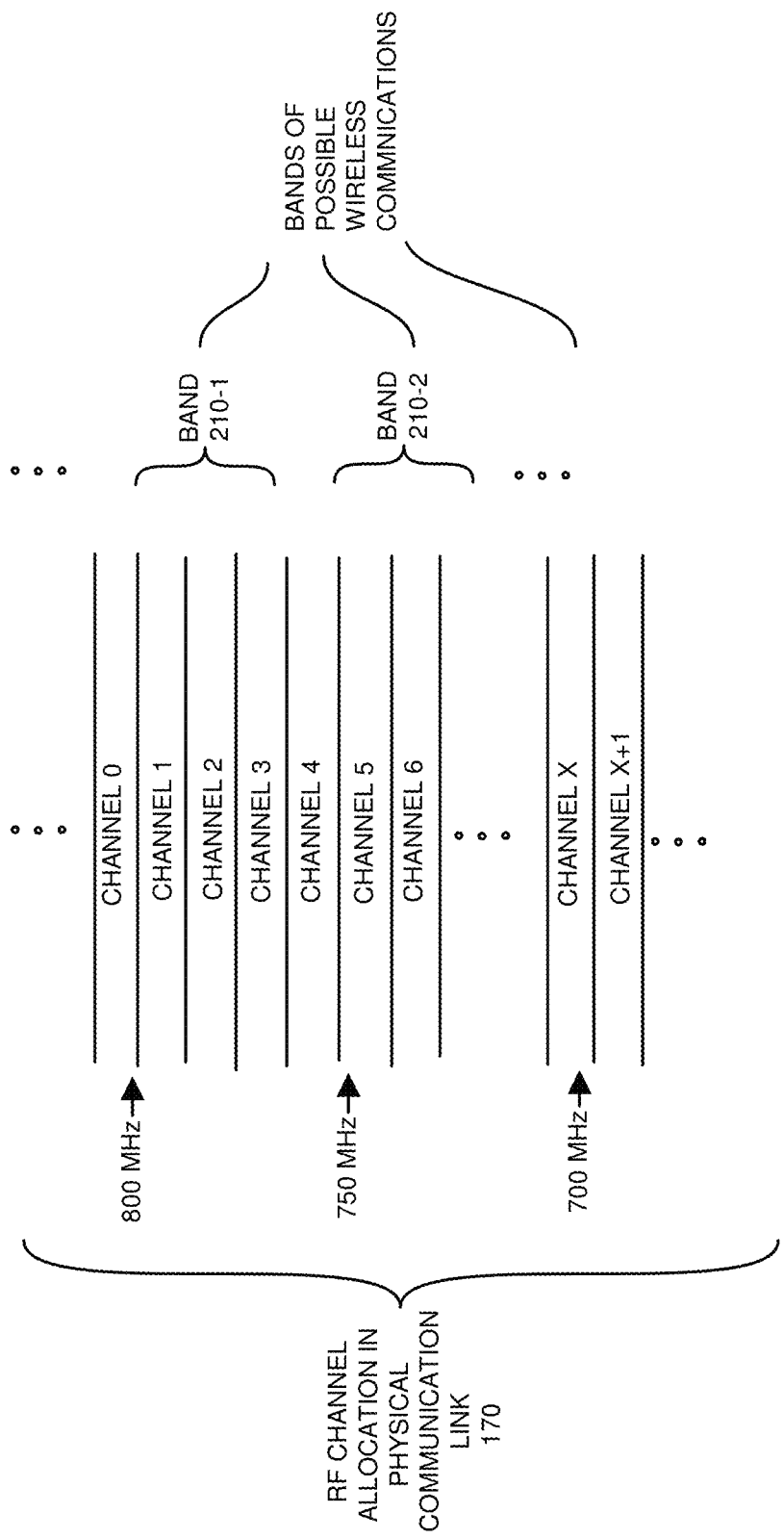
FIG. 2 is an example diagram illustrating allocation of available bandwidth in a physical communication link in comparison to allocation of available bandwidth for wireless communications according to embodiments herein.

FIG. 2 is an example diagram illustrating an overlap use of an RF spectrum in physical communication link versus wireless links according to embodiments herein.

More specifically, as shown, the available frequency bandwidth in the physical communication link 170 can be partitioned to support transmission of multiple channels of data. For example, between 700 and 800 MHz, the physical communication link 170 can be configured to convey channel 1 through channel X at different respective carrier frequencies.

At least a portion of the wireless spectrum (e.g., over-air communications) in communication environment 100 can be allocated to support wireless communications 185 at in the same RF frequencies used to convey data 120 in physical communication link 170. For example, wireless signal generators 105 can be configured to generate wireless communications 185 over the air in frequency band 210-1, frequency band 210-2, etc.

The monitor resource 140 can be configured to monitor any suitable frequency band in which wireless communications are also transmitted in a network environment.

When the physical communication link 170 is not damaged, transmission of the wireless communications 185 in communication environment is not detrimental because physical communication link 170 may include proper shielding such that little or no RF energy from the wireless communications 185 in bands 210 couples onto the physical communication link 170 and causes interference. However, as mentioned, the occurrence of link failure 145 on the physical communication link 170 causes at least a portion of the RF energy in bands 210 to couple onto the physical communication link 170 and cause interference.

Referring again to FIG. 1, as previously discussed, the physical communication link 170 may be damaged for any number of reasons such as a loose connector, rodent chewing on the physical communication link 170, etc. The one or more damaged locations of the physical communication link 170 are places where the RF energy from wireless communications 185 are more likely to couple onto the physical communication link 170 and cause interference via interference signal 155-I.

As previously discussed, the monitor resource monitors a presence of RF energy in physical communication link 170 in a particular frequency band such as the frequency band between 700 and 800 MHz. Monitoring in this range is shown by way of non-limiting example only. Any desirable frequency band where interference is expected can be monitored.

In one embodiment, in response to sensing presence of interference signal 155-I in the monitored frequency band on the physical communication link 170, the monitor resource 140 transmits one or more notification 165 (collectively, notification 165-1, notification 165-2, . . . ) to mitigate affects of the interference such as interference signal 155-I caused by the wireless communications 185 coupling onto the physical communication link 170.

As will be discussed later in this specification, monitor resource 140 can direct a respective notification 165 to any suitable resource. For example, in one embodiment, in response to sensing or detecting interference signal 155-I above an acceptable level, the monitor resource 140 generates and transmits notification 165-1 to transmitter 190. The notification 165-1 can be a status message indicating likely presence of the interference signal 155-I coupling onto the physical communication link 170. Additionally or alternatively, the notification 165-1 can be a command to control transmitter 190.

Also, as will be discussed later in this specification, monitor resource 140 can generate and transmit a respective notification 165-2 to any suitable resource such as remote resource manager 199 or another upstream or downstream network element. The notification 165-2 can include location information 150 and/or a unique identifier value associated with transmitter 190 and/or physical communication link 170. Location information 150 can specify a location of transmitter 190 and/or physical communication link 170 resides in communication network 100. Further details of generating and transmitting notifications are discussed below.

Figure 3:
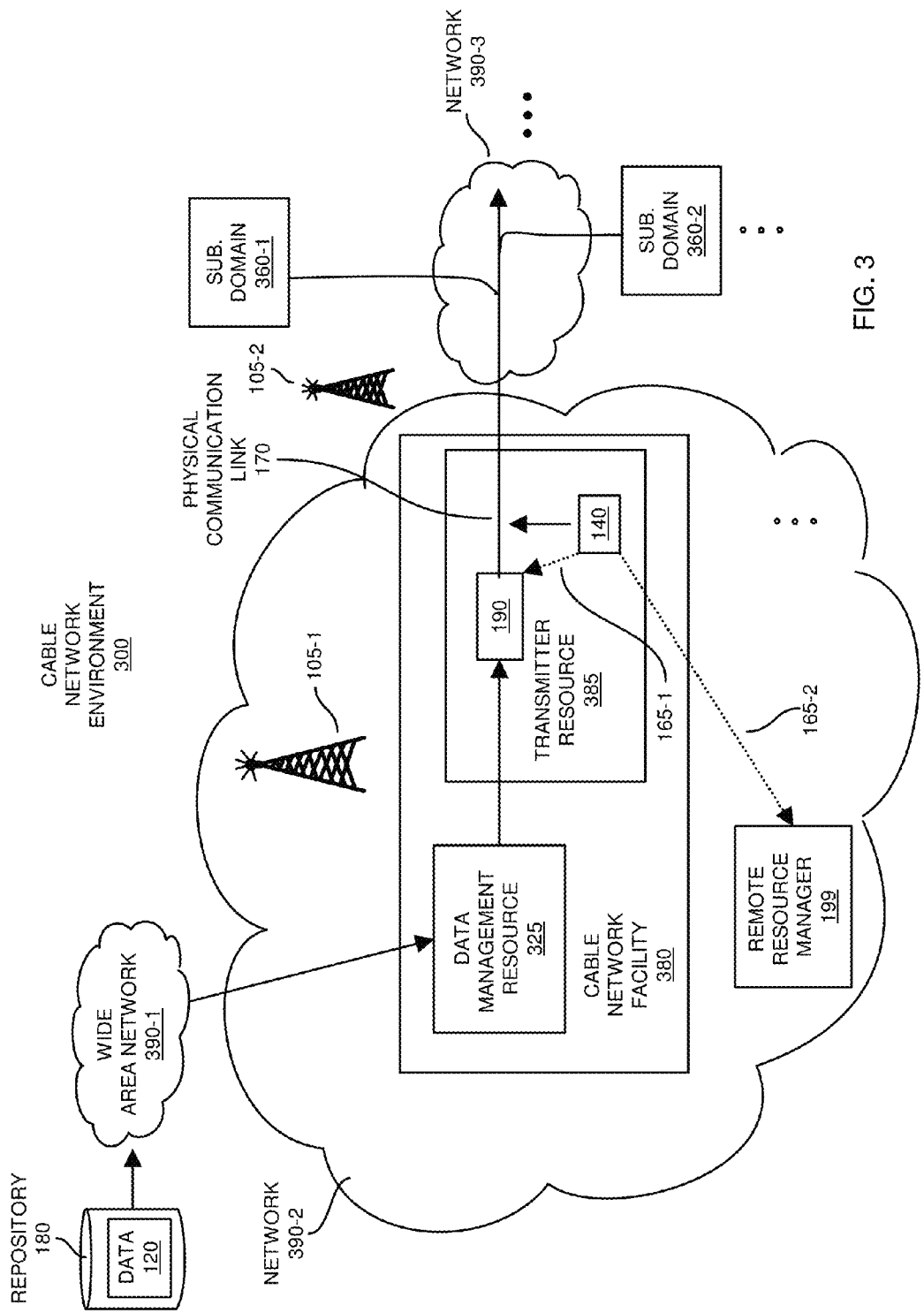
FIG. 3 is an example diagram illustrating implementation of a monitor resource in a cable network environment according to embodiments herein.

FIG. 3 is an example diagram illustrating a cable network environment including a monitor resource according to embodiments herein.

As shown, cable network environment 300 can include a cable network facility 380 such as a cable network plant. The cable network facility 380 can include appropriate equipment to receive content from one or more sources in wide area network 390-1. In one example embodiment, cable network facility 380 transmits the received content such as data 120 over network 390-3 (e.g., an HFC network) to respective subscribers in subscriber domain 360-1, subscriber domain 360-2, etc. By further way of a non-limiting example, the data management resource 325 (such as a core cable modem termination system) and transmitter resource 385 (such as an edge QAM driver or EQAM) can be part of cable modem termination system in cable network facility 380.

As previously discussed, monitor resource 140 can be configured to monitor any suitable frequency band of the physical communication link 170 for presence of wireless interference with respect to signals in physical communication link 170. Assume in this example embodiment that the monitor resource is configured to monitor a portion of data transmitted on carrier radio frequencies between 700 and 800 MHz.

Monitor resource 140 can include one or more bandpass filters to monitor one or more different frequency bands of interest. As previously discussed, at least a portion of the monitored frequency band or bands also can be allocated to support wireless communications 185 such as LTE communications transmitted by wireless signal generators 105.

In one embodiment, the transmitter resource 385 data 120 as a data stream from data management resource 325. The data 120 can be received in an MPEG (Moving Pictures Expert Group) formatted as a layer 2 (data link layer) communications in accordance with an IP (Internet Protocol).

Figure 4:
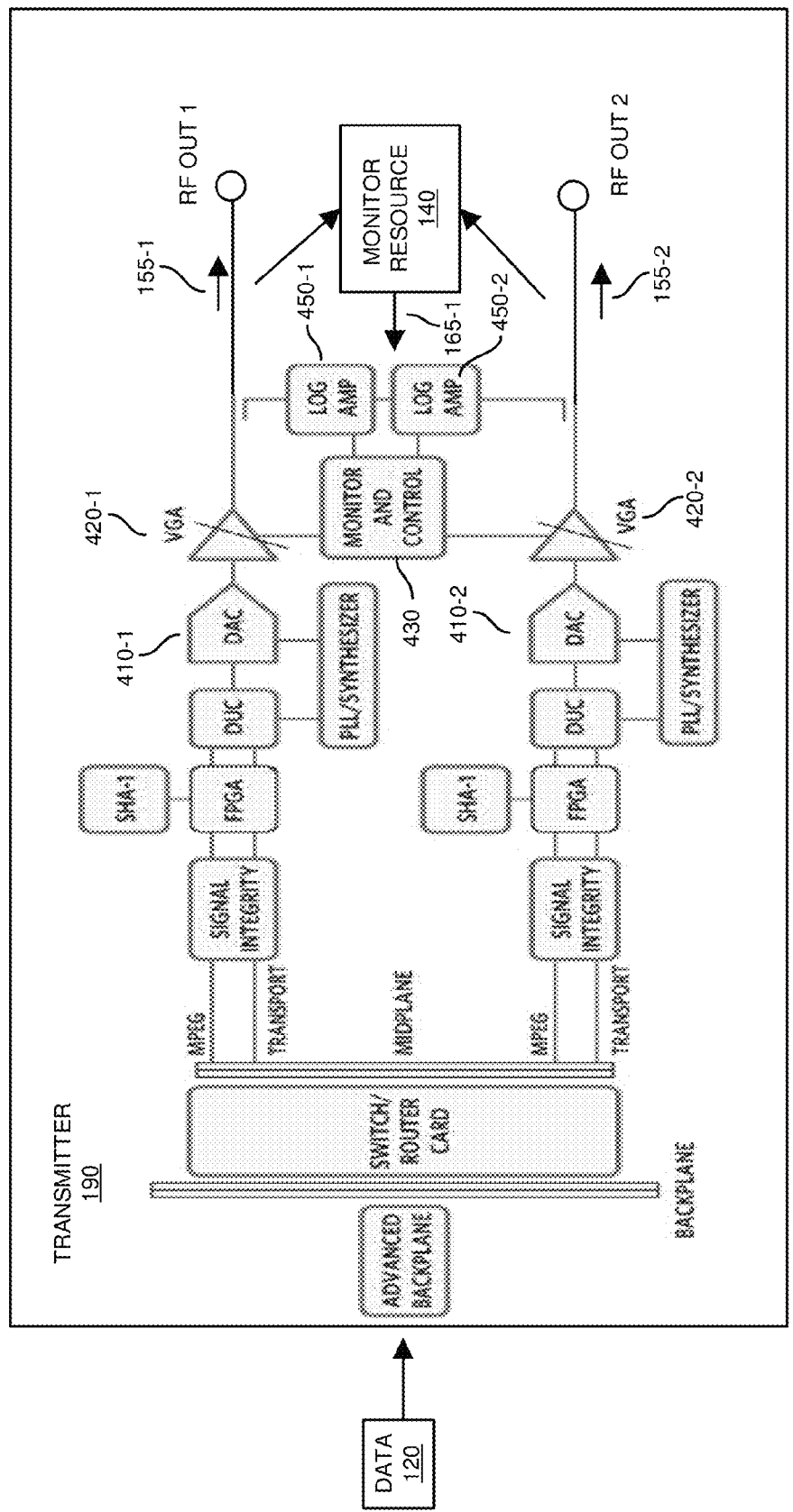
FIG. 4 is an example diagram illustrating a transmitter resource and corresponding monitor resource in a cable network environment according to embodiments herein.

As shown in FIG. 4, the transmitter 190 can be a QAM transmitter device configured to receive the encoded data 120 as a data stream and transmit the encoded data 120 in one or more channels in the monitored frequency band.

In this example embodiment, the transmitter 190 produces a respective QAM (Quadrature Amplitude Modulation) signal (such as original data signal 155-S) to include at least a first signal component (e.g., signal 155-1) and a second signal component (e.g., signal 155-2). A combiner combines signal 155-1 and signal 155-2 to create original data signal 155-S. Thus, a combination of the first signal 155-1 and the second signal 155-2 make up the QAM transmitted signal.

In this example embodiment, the transmitter 190 transmits RF OUT 1 (first part of signal 155-S such as signal 155-1) and RF OUT 2 (second part of signal 155-S such as signal 155-2) onto the respective physical communication link 170 as original data signal 155-S. The data stream received from the data management resource 325 may be a digital signal. Digital to analog converters 410-1 and 410-2 convert the received digital signal to an analog signal. Based on the analog signal from digital to analog converters 410, the variable gain amplifiers 420 output the original data signal 155 onto physical communication link 170.

As shown, the log amplifier 450-1 can be configured to monitor the signal 155-1 with respect to noise or interference and provide feedback to control circuitry 430. Based on the feedback from log amplifier 450-1, the control circuitry 430 controls the gain setting of variable gain amplifier 420-1 such that the signal 155-1 is transmitted at a sufficiently high power level above the noise and/or interference signal present on the physical communication link 170.

In a similar manner, the log amplifier 450-2 can be configured to monitor the signal 155-2 with respect to noise or interference and provide feedback to control circuitry 430. Based on the feedback from log amplifier 450-2, the control circuitry 430 controls the gain setting of variable gain amplifier 420-2 such that the signal 155-2 is transmitted at a sufficiently high power level above the noise and/or interference signal present on the physical communication link 170. This ensures that a downstream device can demodulate and decode the received signal.

Thus, the transmitter 190 can be configured to automatically adjust gains of QAM signal components to overcome presence of the interference signal 155-I present on the monitored physical communication link 170 as a result of the interfering wireless communication signal.

In one embodiment, the monitor resource 140 monitors a parameter such as power level and/or gain associated with the signals 155. If the transmitter 190 attempts to adjust or succeeds at adjusting the power or gain of the original data signal 155-S (or any components such as signal 155-1 or 155-2) above a predetermined threshold value, the monitor resource 140 detects such as condition and generates one or more notifications 165.

More specifically, by way of a non-limiting example, the variable gain amplifiers 420 may be able to transmit the respective signals 155 at a maximum power of 75-80 dB (decibels). The threshold value in monitor resource 140 can be set to a value of 72 dB. The variable gain amplifiers 420 would not normally transmit the signal 155 at such a high power level unless excessive noise or interference was present on the physical communication link 170. Thus, if the power level of the original data signal 155-S (or portion thereof) is above the predetermined in the monitored frequency band or bands, the monitor resource 140 senses a presence of the interference signal 155-I (from wireless communications 185) and generates one or more notifications.

Note that any suitable technique can be used to detect presence of interference signal 155-I on the physical communication link 170 (or other physical transmission medium). For example, embodiments herein can include comparing the signal (original signal+noise+interference) in the physical communication link 170 to a reference signal such as the original data signal 155-S. The comparator circuitry can be a difference function subtracts the original signal from the signal present on the physical communication link. The leftover signal can represent the interference signal.

If a magnitude such as a power level of the interference signal 155-I or (interference signal+the noise signal) in the monitored frequency band is detected as being above a respective threshold value, the monitor resource 140 also generates and transmits any of notifications as discussed herein.

Accordingly, embodiments herein can include directly monitoring a strength or power level of the interference signal present on the physical communication link 170 as caused by due to coupling of wireless communications 185 onto the physical communication link 170.

Note that the noise in the monitored frequency band or bands may be negligible. In such an instance, the leftover signal produced by the comparator circuitry may be mostly from interference.

In one embodiment, the monitor resource 140 transmits a notification 165-1 of a detected condition such as presence of the interference signal to shut down the transmitter 190. Shutting down the transmitter 190 and/or corresponding variable gain amplifiers can prevent saturation and possible damage.

In yet further embodiments, the control circuitry 430 can receive notification 165-1 and discontinue transmission of all or a portion of frequency bands of original data signal 155-S in response to excessive interference. For example, certain embodiments herein can include detecting in which range interference occurs and limiting a shut down to within a particular band in which the interference above a threshold value is detected or sensed. Thus, embodiments herein can include generating the notification 165-1 to specify one or more channels of data that are most affected by the interference signal and that should no longer be transmitted by the transmitter 190.

Referring again to FIG. 3, note that the monitor resource 140 can also receive or retrieve status information (e.g., power setting information and/or power measurement information) from the transmitter 190 in order to sense interference. In such an instance, the stored information received from the transmitter 190 can indicate that the transmitter 190 attempts to transmit the original data signal above a threshold value. As mentioned, the monitor resource 140 can be configured to generate the one or more notifications 165 depending on the status information.

In accordance with further embodiments as shown, the monitor resource 140 can communicate notification 165-2 such as one or more messages to remote resource manager 199. The monitor resource 140 can transmit the message over any suitable communication link such as the Internet to remote resource manager 199. As its name suggests remote resource manager 199 can reside at a remote location such as central management office with respect to cable network facility 380.

As previously discussed, the notification 165-2 transmitted to remote resource manager 199 can include location information specifying a location of the transmitter 190 and/or physical communication link 170 where the failure occurred. The notification 165-2 also can include information specifying the type of failure that occurred. Accordingly, the remote resource manager 199 can identify occurrence of the link failure 145 and take appropriate action to correct the failure.

As mentioned, notification 165-2 may include any suitable information. For example, the failure notification 165-2 can include a unique identifier value assigned to the transmitter 190, unique identifier value of the physical communication link 170, etc., enabling maintenance personnel to map the unique identifier value to a corresponding physical location in network 390-2.

In yet further embodiments, the monitor resource 140 can be configured to generate the notification 165-2 of failure to include specific useful information about the failure. For example, a notification can further include useful troubleshooting information such as power drive information associated with transmitter 190 driving the physical communication link. The information in notification 165-2 can include one or more types of information such as: settings or status information received from the transmitter device, a measured level of power on the physical communication link, a range of frequencies in which the failure occurs, the monitored frequency band in which the failure occurred due to coupling of unwanted wireless communications onto the physical communication link, presence of an interference signal on the physical communication link 170, one or more channels of data that are affected by the interference signal, etc. As previously discussed, a technician or repair personnel receiving this additional information may be better equipped to troubleshoot and correct the failure.

Figure 5:
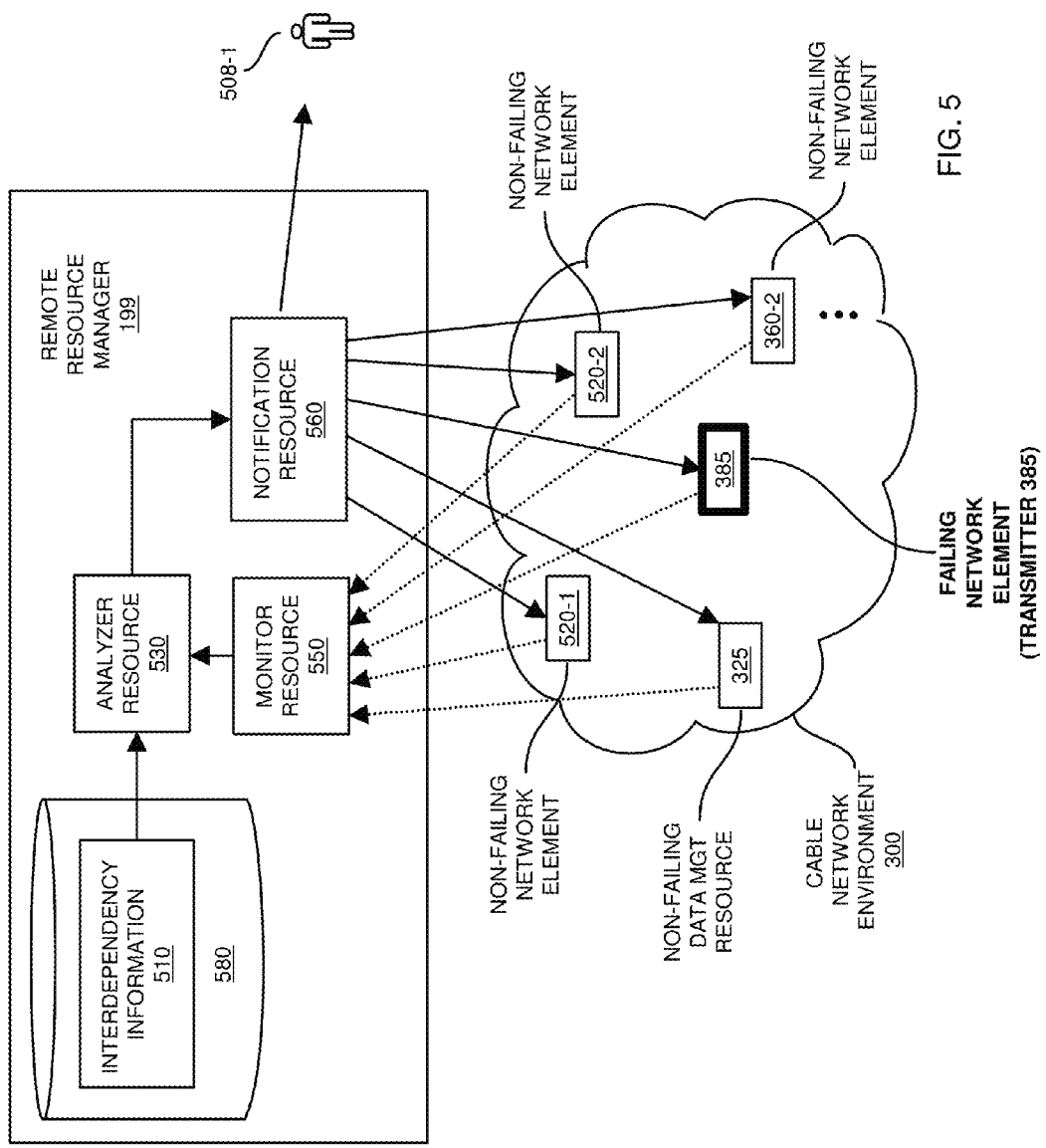
FIG. 5 is an example diagram illustrating notification of a failure to a remote resource manager according to embodiments herein.

Embodiments herein can further include providing notification of a respective failure to one or more upstream or downstream devices in the cable network environment 300. For example, FIG. 5 is an example diagram illustrating transmission of a failure notification to a remote resource manager 199 as well as distribution of messages to other network elements according to embodiments herein.

As shown, remote resource manager 199 includes monitor resource 550. Monitor resource 550 monitors a set of multiple functionally interconnected network elements such as non-failing network element 520-1, non-failing network element 520-2, data management resource 325, transmitter resource 385, subscriber domain 360-2, etc. The multiple interconnected network elements in cable network environment 300 cooperatively communicate in a data plane of to transmit content to one or more subscribers.

By way of a non-limiting example, monitor resource 550 can be configured to communicate with each of the network elements to learn whether each of the respective network elements is functioning properly. Messages can be pushed or pulled from the network elements to learn of a respective status. For example, each of the network elements (including failing transmitter resource 385) can be configured to periodically generate and transmit health information to the monitor resource 550. Alternatively, the network elements can respond to query messages generated by the monitor resource 550 to the network elements.

Depending on the type of function provided by the respective network element, the respective network element may be prone to many different types of failures. As mentioned, transmitter 190 and/or physical communication link 170 are prone to interference failures caused by nearby wavelengths communications 185. In one embodiment, the monitor resource 550 receives (health) status information from the transmitter resource 385 (and monitor resource 140) and other network elements in accordance with a communication protocol such as SNMP (Simple Network Management Protocol), although any suitable communication protocol can be used to receive health status updates from the different network elements.

Each respective health status message from a network element can indicate information such as: a geographical location of a corresponding network element, a unique identifier value of the network element, a health status of the network element, etc.

Because of the interdependency amongst network elements, failure of a given network element in the cable network environment 300 may render it impossible to transmit content downstream to one or more subscribers. For example, the transmitter resource 385 and/or physical communication link 170 can experience a link failure 145 as previously discussed. Monitor resource 550 receives notification of the failure and forwards notification of the failure to analyzer resource 530.

Analyzer resource 530 accesses interdependency information 510 stored in repository 580. In one embodiment, interdependency information includes topology information capturing interconnectivity and dependency of upstream and downstream network elements with respect to each other.

Via the interdependency information 510, the analyzer resource 530 is able to determine any of one or more upstream network elements (e.g., data management resource 325) or downstream network elements (e.g., subscriber domains 360) in the cable network environment 300 that will be impacted by the detected link failure 145.

In one embodiment, the analyzer resource 530 notifies the notification resource 560 of the one or more network elements that are affected by the detected link failure 145. Notification resource 560 provides notification of the link failure 145 to one or more upstream and/or downstream network elements. By further way of a non-limiting example, to each non-failing network element, the notification resource 560 can be configured to transmit location information, unique identifier information, etc. associated with the failing network element.

Thus, a remote resource manager 199 can be configured to notify the relevant components (e.g., upstream and/or downstream network elements) regarding any of one or more different types of failures.

To reduce disruption of service, the notified network elements in the upstream and/or downstream direction can be proactive about automatically establishing an alternative or backup path in which to transmit all or a portion of the original data signal 155-S to one or more downstream subscribers in the event of a failure.

Figure 6:
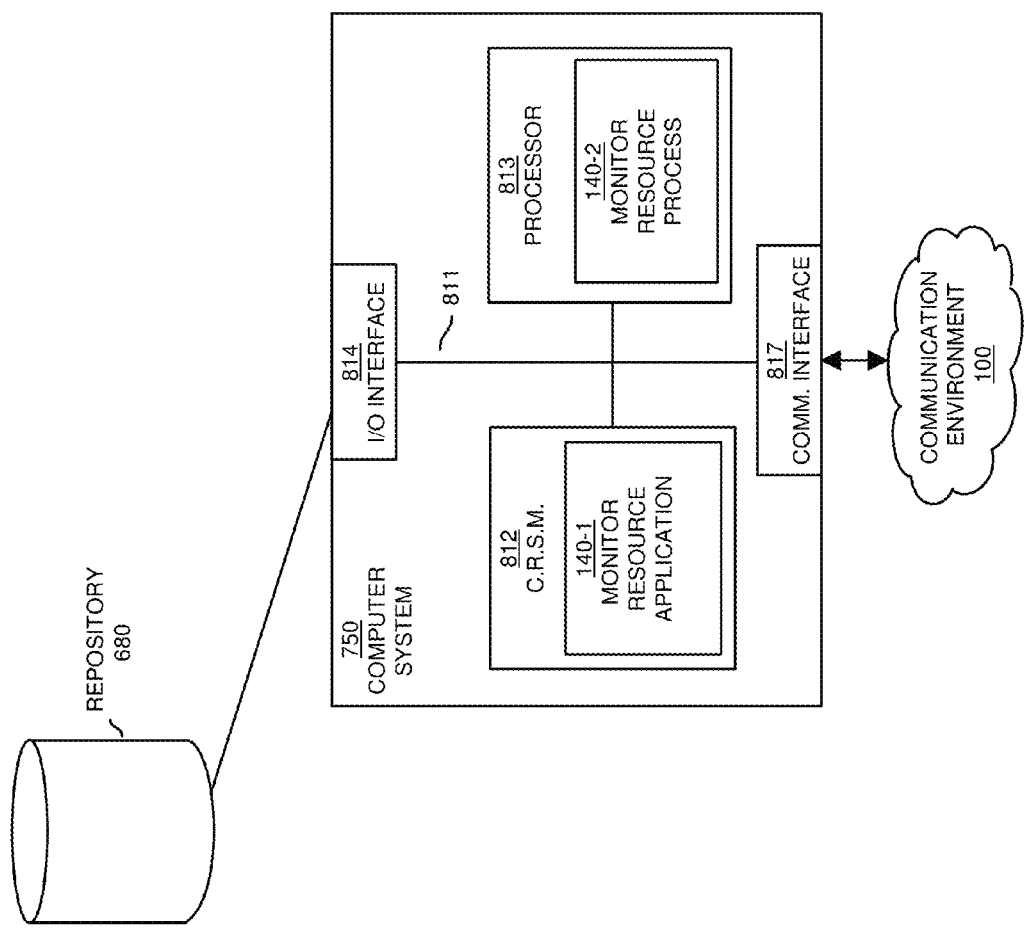
FIG. 6 is a diagram illustrating an example computer architecture in which to execute any of the functionality according to embodiments herein.

FIG. 6 is an example block diagram of a computer device for implementing any of the operations as discussed herein.

As shown, computer system 750 such as a computer device of the present example can include an interconnect 811 that couples computer readable storage media 812 such as a non-transitory type of media (i.e., any type of hardware storage medium, tangible storage medium, etc.) in which digital information can be stored and retrieved, a processor 813 (e.g., one or more processor devices or hardware processors), I/O interface 814, and a communications interface 817. Communications interface 817 enables the computer system 750 to communicate with other network elements present in a corresponding network environment.

I/O interface 814 provides connectivity to a repository 680 and, if present, other devices such as a playback device, display screen, keypad, a computer mouse, etc.

Computer readable storage medium 812 can be any hardware storage resource or device such as memory, optical storage, hard drive, floppy disk, etc. In one embodiment, the computer readable storage medium 812 stores instructions and/or data.

Communications interface 817 enables the computer system 750 processor 813 to communicate with network elements in communication environment 100 retrieve information from remote sources such as network elements and communicate with other computers. I/O interface 814 enables processor 813 to retrieve stored information from repository 680.

As shown, computer readable storage media 812 is encoded with monitor resource application 140-1 (e.g., software, firmware, computer code, etc.) executed by processor 813. Monitor resource application 140-1 can be configured to include instructions to implement any of the operations as discussed herein.

During operation of one embodiment, processor 813 accesses computer readable storage media 812 via the use of interconnect 811 in order to launch, run, execute, interpret or otherwise perform the instructions in monitor resource application 140-1 stored on computer readable storage medium 812.

Execution of the monitor resource application 140-1 produces processing functionality such as monitor resource process 140-2 in processor 813. In other words, the monitor resource process 140-2 associated with processor 813 represents one or more aspects of executing monitor resource application 140-1 within or upon the processor 813 in the computer system 750.

Those skilled in the art will understand that the computer system 750 can include other processes and/or software and hardware components, such as an operating system that controls allocation and use of hardware resources to execute monitor resource application 140-1.

In accordance with different embodiments, note that computer system 750 may be any of various types of devices, including, but not limited to, a mobile computer, a personal computer system, a server resource, a wireless device, base station, phone device, desktop computer, laptop, notebook, netbook computer, mainframe computer system, handheld computer, workstation, network computer, application server, storage device, a consumer electronics device such as a camera, camcorder, set top box, mobile device, video game console, handheld video game device, a peripheral device such as a switch, modem, router, or in general any type of computing or electronic device. The computer system 750 may reside at any location or can be included in any suitable resource in communication environment 100 to implement functionality as discussed herein.

Functionality supported by the different resources will now be discussed via flowcharts in FIGS. 7-9. Note that the steps in the flowcharts below can be executed in any suitable order.

Figure 7:
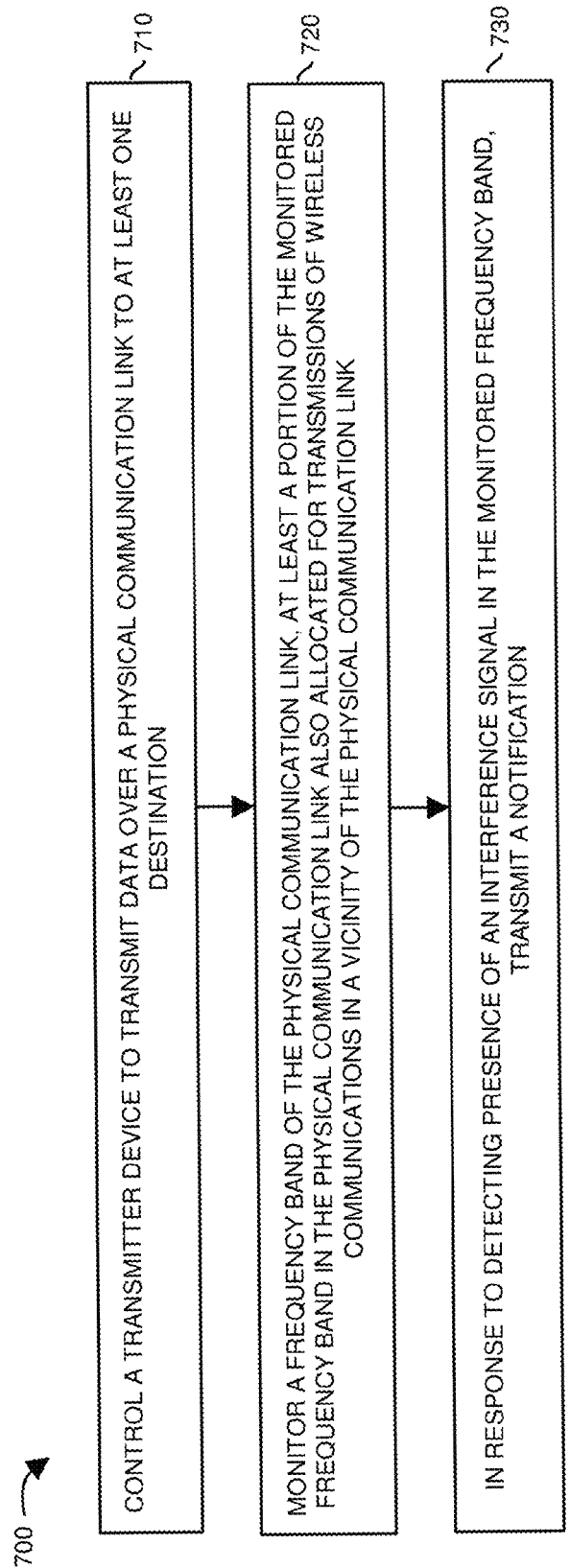
FIG. 7 is an example diagram illustrating a method of detecting presence of an interference signal and transmission of one or more notifications according to embodiments herein.

FIG. 7 is a flowchart 700 illustrating an example method according to embodiments. Note that there will be some overlap with respect to concepts as discussed above.

In processing block 710, the transmitter resource 390 controls transmitter 190 to transmit data 120 over a physical communication link 170 to at least one destination 160.

In processing block 720, the monitor resource 140 monitors a frequency band of the physical communication link 170. At least a portion of the monitored frequency band in the physical communication link 170 is also allocated for transmissions of wireless communications 185 in a vicinity of the physical communication link 170.

In processing block 730, in response to detecting or sensing presence of an interference signal 155-I in the monitored frequency band, the monitor resource 140 transmits one or more notifications 165 (such as notification 165-1, notification 165-2, . . . ).

Figure 8:
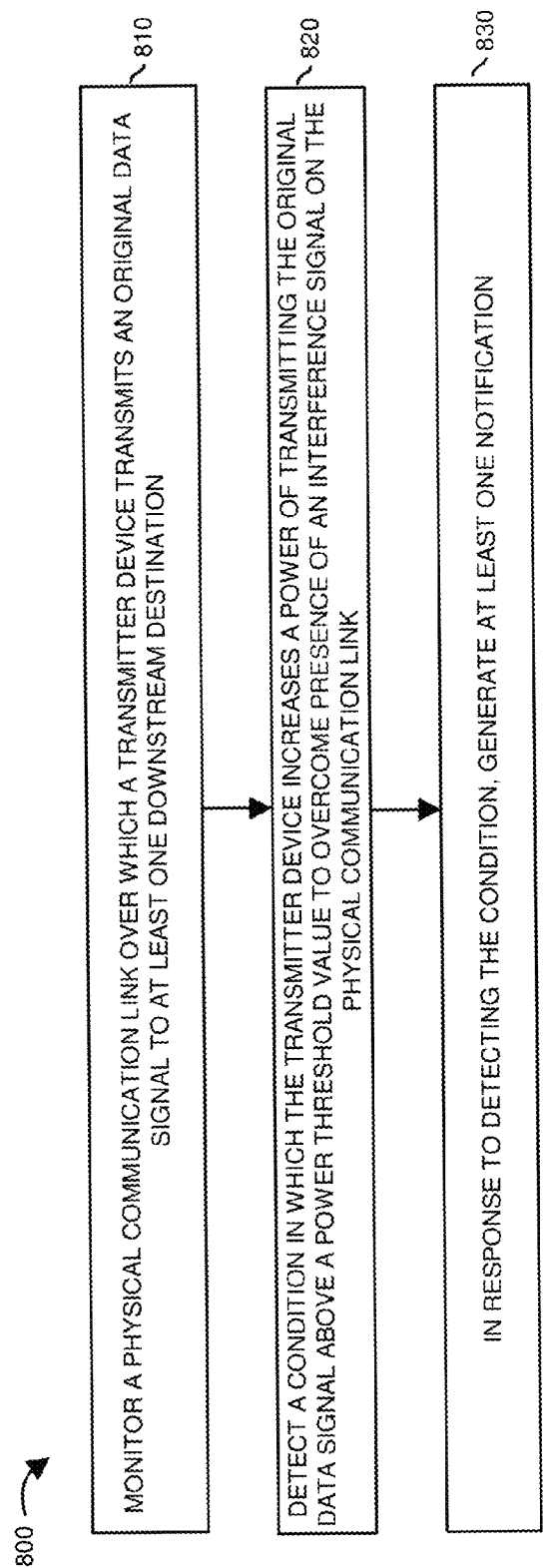
FIG. 8 is an example diagram illustrating a method of monitoring signal power and generation of one or more notifications according to embodiments herein.

FIG. 8 is a flowchart 800 illustrating an example method according to embodiments. Note that there will be some overlap with respect to concepts as discussed above.

In processing block 810, the monitor resource 140 monitors a physical communication link 170 over which a transmitter 190 transmits an original data signal 155-S to at least one downstream destination.

In processing block 820, the monitor resource 140 detects or senses a condition in which the transmitter 190 increases a power of transmitting the original data signal 155-S above a power threshold value to overcome presence of an interference signal 155-I on the physical communication link 170.

In processing block 830, in response to detecting the condition such as a failure 145, the monitor resource 140 generates at least one notification 165.

Figure 9:
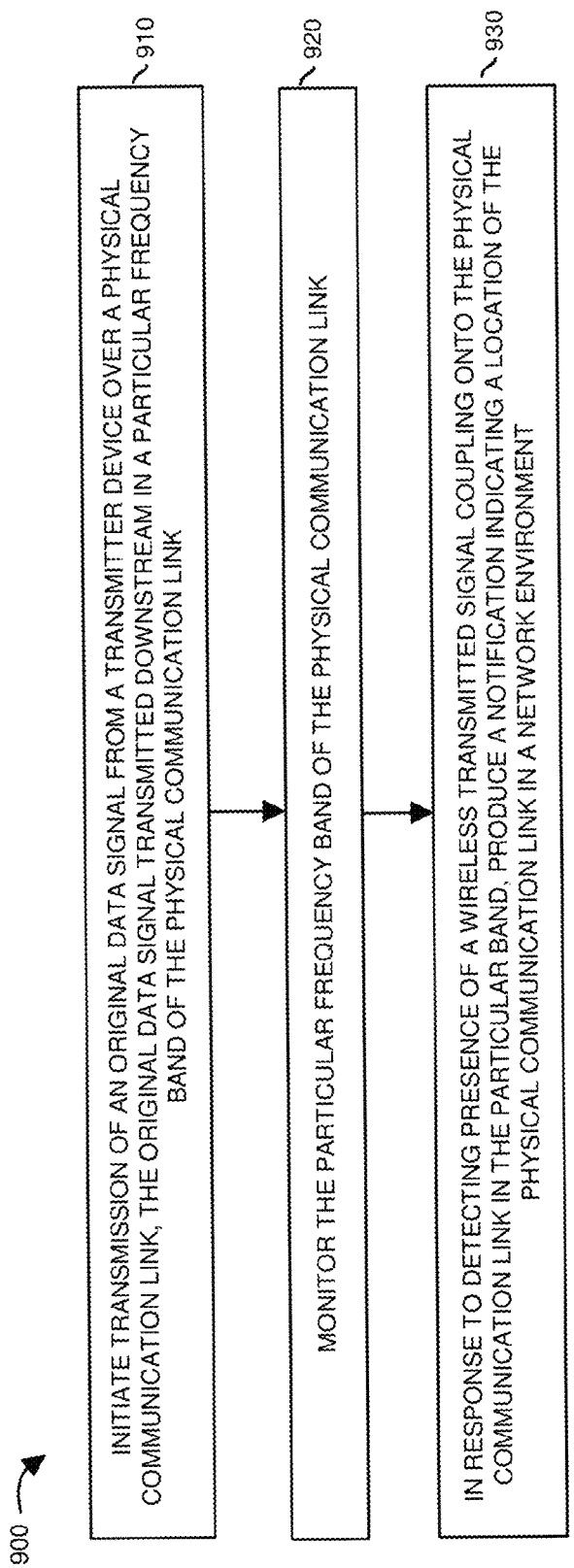
FIG. 9 is an example diagram illustrating a method of detecting presence of an interference signal in a monitored frequency band and providing one or more notifications according to embodiments herein.

FIG. 9 is a flowchart 900 illustrating an example method according to embodiments. Note that there will be some overlap with respect to concepts as discussed above.

In processing block 910, the transmitter resource 385 initiates transmission of an original data signal 155-S from transmitter 190 over a physical communication link 170. The original data signal 155-S is transmitted downstream in a particular frequency band of the physical communication link 170.

In processing block 920, the monitor resource 140 monitors the particular frequency band of the physical communication link 170.

In processing block 930, in response to sensing or detecting presence of a wireless transmitted signal coupling onto the physical communication link 170 in the particular band, the monitor resource 140 produces a notification indicating a location of the physical communication link 170 in the cable network environment 300.

Note again that techniques herein are well suited for mitigating affects of wireless coupling onto signals transmitted over a physical communication link. However, it should be noted that embodiments herein are not limited to use in such applications and that the techniques discussed herein are well suited for other applications as well.

Based on the description set forth herein, numerous specific details have been set forth to provide a thorough understanding of claimed subject matter. However, it will be understood by those skilled in the art that claimed subject matter may be practiced without these specific details. In other instances, methods, apparatuses, systems, etc., that would be known by one of ordinary skill have not been described in detail so as not to obscure claimed subject matter. Some portions of the detailed description have been presented in terms of algorithms or symbolic representations of operations on data bits or binary digital signals stored within a computing system memory, such as a computer memory. These algorithmic descriptions or representations are examples of techniques used by those of ordinary skill in the data processing arts to convey the substance of their work to others skilled in the art. An algorithm as described herein, and generally, is considered to be a self-consistent sequence of operations or similar processing leading to a desired result. In this context, operations or processing involve physical manipulation of physical quantities. Typically, although not necessarily, such quantities may take the form of electrical or magnetic signals capable of being stored, transferred, combined, compared or otherwise manipulated. It has been convenient at times, principally for reasons of common usage, to refer to such signals as bits, data, values, elements, symbols, characters, terms, numbers, numerals or the like. It should be understood, however, that all of these and similar terms are to be associated with appropriate physical quantities and are merely convenient labels. Unless specifically stated otherwise, as apparent from the following discussion, it is appreciated that throughout this specification discussions utilizing terms such as "processing," "computing," "calculating," "determining" or the like refer to actions or processes of a computing platform, such as a computer or a similar electronic computing device, that manipulates or transforms data represented as physical electronic or magnetic quantities within memories, registers, or other information storage devices, transmission devices, or display devices of the computing platform.

While this invention has been particularly shown and described with references to preferred embodiments thereof, it will be understood by those skilled in the art that various changes in form and details may be made therein without departing from the spirit and scope of the present application as defined by the appended claims. Such variations are intended to be covered by the scope of this present application. As such, the foregoing description of embodiments of the present application is not intended to be limiting. Rather, any limitations to the invention are presented in the following claims.

We claim:

1. A method comprising:
    controlling a transmitter device to transmit data over a physical communication link to at least one destination;
    monitoring a frequency band of the physical communication link, at least a portion of the monitored frequency band in the physical communication link also allocated for transmissions of wireless communications in a vicinity of the physical communication link; and
    in response to sensing presence of an interference signal in the monitored frequency band, the presence of the interference signal sensed based on a power level of transmitting the data over the physical communication link, transmitting a notification.

2. The method as in claim 1, wherein the transmitter device transmits multiple channels of data over the physical communication link, at least one of the multiple channels of data transmitted in the monitored frequency band.

3. The method as in claim 2, wherein the transmitter device is a QAM (Quadrature Amplitude Modulation) transmitter device, the QAM transmitter device transmitting the multiple channels of data over the physical communication link to the at least one destination.

4. The method as in claim 3 further comprising:
    generating the notification to indicate a geographical location of the QAM transmitter device.

5. The method as in claim 1 further comprising:
    generating the notification to terminate transmission of data over the physical communication link for at least a portion of the particular frequency band, the notification being a control command directed to the transmitter device.

6. The method as in claim 1 further comprising:
    retrieving location information specifying a location of the transmitter device in a cable network environment; and
    generating the notification to indicate the location of the transmitter device.

7. The method as in claim 6, wherein transmitting the notification includes notifying a cable network management resource of a failure condition associated with the physical communication link, the interference signal present in the monitored frequency band as a result of the failure in which the wireless communications couple onto the physical communication link.

8. The method as in claim 7 further comprising:
    prior to transmitting the notification, generating the notification to indicate that the interference signal was sensed as being present in the monitored frequency band.

9. The method as in claim 1, wherein the particular frequency band includes at least a portion of frequencies in a frequency range between 700 megahertz and 800 megahertz.

10. The method as in claim 1 further comprising:
    determining at least one frequency at which the interference signal is present; and
    generating the notification to indicate an identity of the physical communication link and the at least one frequency at which the interference signal is present in the physical communication link as caused by the wireless communications.

11. The method as in claim 1, wherein sensing the interference signal in the monitored frequency band includes:
    detecting that the transmitter device at least attempts to transmit the data in the particular frequency band over the physical communication link above a power threshold value.

12. The method as in claim 11 further comprising:
    in response to sensing presence of the interference signal, controlling the transmitter device to discontinue transmitting data in a channel of the particular frequency band.

13. The method as in claim 1 further comprising:
    generating and transmitting the notification in response to an increase in a power level of transmitting the data.

14. The method as in claim 13 further comprising:
    generating the notification to indicate a geographical location of the transmitter device.

15. A method comprising:
monitoring a physical communication link over which a transmitter device transmits an original data signal to at least one downstream destination;
sensing a condition in which the transmitter device increases a power of transmitting the original data signal above a power threshold value to overcome presence of an interference signal on the physical communication link; and
in response to sensing the condition, generating at least one notification.

16. The method as in claim 15, wherein the interference signal is present on the physical communication link as a result of a transmission of wireless communications present in a vicinity of the physical communication link, the wireless communications transmitted in accordance with at least one radio frequency at which the original data signal is transmitted over the physical communication link.

17. The method as in claim 16, wherein monitoring the physical communication link includes monitoring a frequency band at which at least one of the wireless communications is transmitted in the vicinity of the physical communication link.

18. The method as in claim 17 further comprising:
generating the at least one notification to include a message indicating a geographical location of the physical communication link.

19. The method as in claim 16 further comprising:
generating the at least one notification to include a command to the transmitter device, the command indicating to terminate transmission of the original data signal over the physical communication link in a frequency band at which the wireless communications are transmitted.

20. The method as in claim 15, wherein monitoring the system includes measuring a magnitude of a power level of transmitting the original data signal over the physical communication link in a frequency band at which wireless communications are transmitted in a vicinity of the physical communication link.

21. The method as in claim 15, wherein sensing the condition in which the transmitter device increases a power of transmitting the original data signal above a power threshold value includes:
receiving power setting information from the transmitter device, the power settings information indicating that the transmitter device attempts to transmit the original data signal above the power threshold value.

22. The method as in claim 16 further comprising:
providing the notification to at least one upstream device with respect to the transmitter device, the notification indicating the inability to transmit at least a portion of the original data signal over the physical communication link.

23. A method comprising:
initiating transmission of an original data signal from a transmitter device over a physical communication link, the original data signal transmitted downstream in a particular frequency band of the physical communication link;
monitoring the particular frequency band of the physical communication link;
in response to sensing presence of a wireless transmitted signal coupling onto the physical communication link in the particular band, producing a notification, the notification including geographical information indicating a location of the physical communication link in a network environment;
transmitting the notification to a cable network management resource, the notification indicating occurrence of a failure condition associated with the physical communication link, the interference signal present in the monitored frequency band as a result of the wireless transmitted signal coupling onto the physical communication link;
wherein sensing the presence of the wireless transmitted signal includes: sensing that the transmitter device at least attempts to transmit the original data signal above a power threshold value.

24. The method as in claim 23, wherein initiating transmission of the original data signal from the transmitter device over the physical communication link includes producing a QAM (Quadrature Amplitude Modulation) signal from the transmitter device, the QAM signal including at least a first signal component and a second signal component, the QAM transmitter device configured to monitor the first signal component and the second signal component and automatically adjust a gain of producing the first signal component and a gain of the second signal component depending on a magnitude of the wireless transmitted signal coupling onto the physical communication link.

25. A computer system comprising:
at least one processor device; and
a hardware storage resource coupled to the at least one processor device, the hardware storage resource storing instructions that, when executed by the at least one processor device, causes the at least one processor device to perform operations of:
monitoring a frequency band of a physical communication link over which a transmitter device transmits data over a physical communication link to at least one destination, at least a portion of the monitored frequency band in the physical communication link also allocated for transmissions of wireless communications in a vicinity of the physical communication link; and
in response to sensing presence of an interference signal in the monitored frequency band based on occurrence of a condition in which the transmitter device increases a power level of transmitting the data over the physical communication link, transmitting a notification.

26. The computer system as in claim 25, wherein the at least one processor device further performs operations of:
retrieving location information specifying a location of the transmitter device in a cable network environment; and
generating the notification to indicate the location of the transmitter device.

27. The computer system as in claim 25, wherein the particular frequency band includes at least a portion of frequencies in a frequency range between 700 megahertz and 800 megahertz.

28. The computer system as in claim 25, wherein the at least one processor device further performs operations of:
determining at least one frequency at which the interference signal is present; and
generating the notification to indicate an identity of the physical communication link and the at least one frequency at which the interference signal is present in the physical communication link as caused by the wireless communications.

29. The computer system as in claim 25, wherein sensing the interference signal in the monitored frequency band includes:

detecting that the transmitter device at least attempts to transmit the data in the particular frequency band over the physical communication link above a power threshold value.

30. The computer system as in claim 29 further comprising:
in response to sensing presence of the interference signal, controlling the transmitter device to discontinue transmitting data in at least one channel of the particular frequency band.

31. Computer-readable hardware storage having instructions stored thereon, the instructions, when carried out by at least one processing device, causes the at least one processing device to perform operations of:
monitoring a frequency band of a physical communication link over which a transmitter device transmit data over a physical communication link to at least one destination, at least a portion of the monitored frequency band in the physical communication link also allocated for transmissions of wireless communications in a vicinity of the physical communication link; and
in response to sensing presence of an interference signal in the monitored frequency band, the presence of the interference signal sensed based on a power level of transmitting the data over the physical communication link, transmitting a notification.

* * * * *